Feb. 8, 1966     C. H. BARNES     3,233,765

SPECIAL PURPOSE VEHICLES

Filed June 3, 1963     5 Sheets-Sheet 1

INVENTOR.
CHARLES H. BARNES
BY
Christie, Parker & Hale
ATTORNEYS

INVENTOR.
CHARLES H. BARNES

Feb. 8, 1966   C. H. BARNES   3,233,765
SPECIAL PURPOSE VEHICLES
Filed June 3, 1963   5 Sheets-Sheet 4
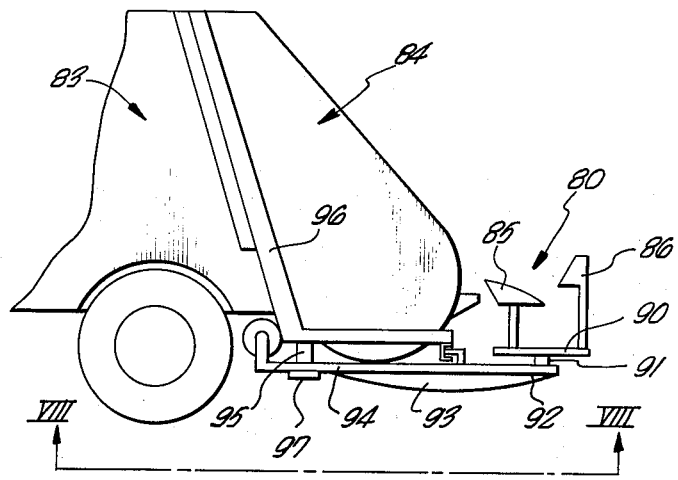
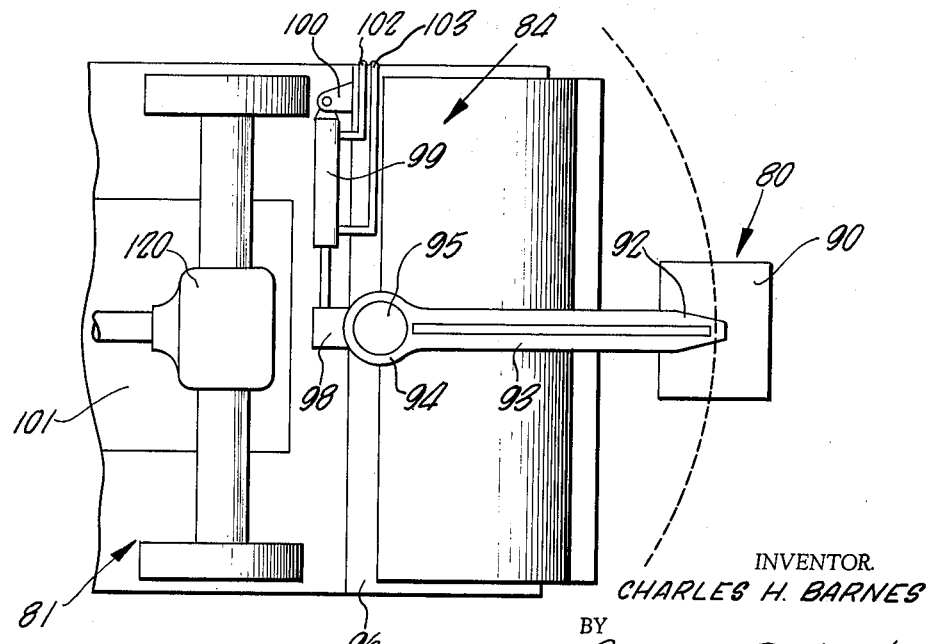
INVENTOR.
CHARLES H. BARNES
BY
*Christie, Parker & Hale*
ATTORNEYS.

Feb. 8, 1966 C. H. BARNES 3,233,765
SPECIAL PURPOSE VEHICLES
Filed June 3, 1963 5 Sheets-Sheet 5
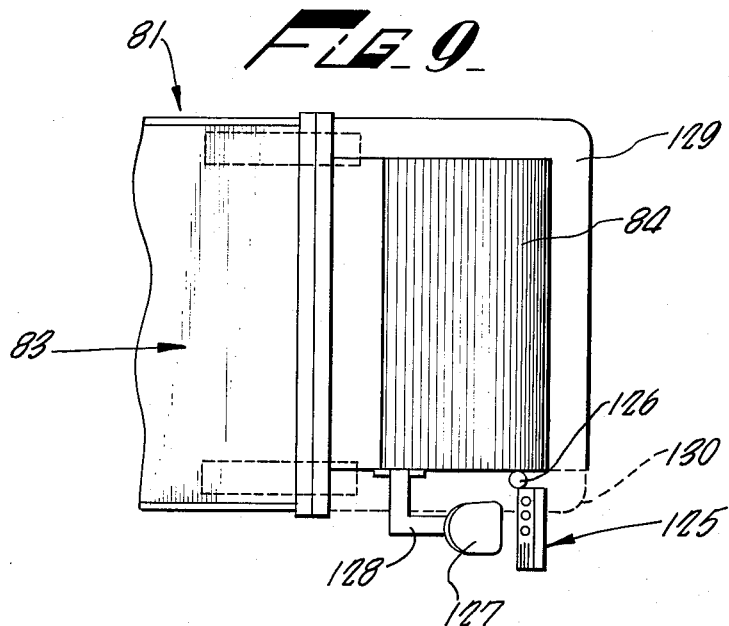
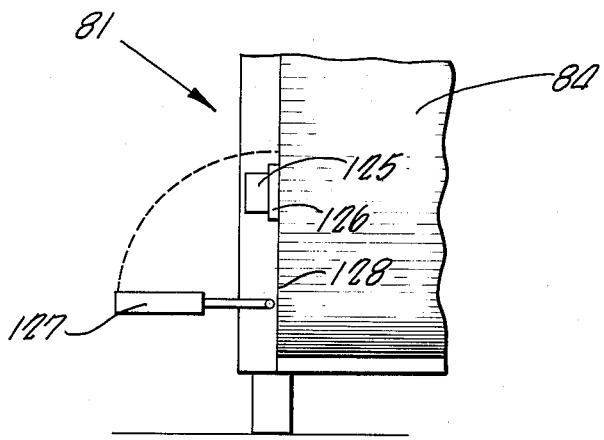
INVENTOR.
CHARLES H. BARNES
BY
Christie Parker Hale
ATTORNEYS.

United States Patent Office 3,233,765
Patented Feb. 8, 1966

3,233,765
SPECIAL PURPOSE VEHICLES
Charles H. Barnes, 2766 E. Glenoaks Blvd.,
Glendale, Calif.
Filed June 3, 1963, Ser. No. 284,958
12 Claims. (Cl. 214—500)

This invention relates to service-type vehicles such as refuse collection trucks and, more particularly, to improved means for controlling such vehicles during periods in which the vehicle is engaged in its special service function whereby the number of persons required to operate such vehicles is reduced.

The present invention is described in conjunction with refuse collection vehicles since the advantage and improvements resulting from the practice of the present invention are most apparent in such an environment. The structures of prior refuse collecting vehicles have been predicated upon the configuration of conventional truck bodies. The methods of operation of such vehicles have been dependent upon methods of operation of conventional trucks in that the refuse collecting, compacting, and storing devices are built around conventional truck chassis which have conventional drive mechanisms. These trucks have a single and fixed control station at the forward end of the vehicle which is used to control the vehicle both in transit from the yard to the refuse collecting route and upon the refuse collecting route. These vehicles require a driver and one or more refuse loaders, referred to in the trade as "swampers," as personnel of a refuse truck crew. It is especially on routes for collection of refuse in residential areas that the practices of operation of prior refuse collecting vehicles are inefficient. This is true since the driver works while the swampers are idle, and the swampers load the vehicle while the driver waits to guide the vehicle to the next pick-up station. Loading conventionally is done at the rear end of the vehicle. Where the driver doubles as a swamper, at each refuse collecting station the driver must walk from the truck cab to the refuse hopper at the rear of the vehicle and then back to the cab.

In an attempt to overcome these problems some refuse collection vehicles have been provided with auxiliary control stations on the running board of the cab on the curbside of the vehicle. Such modified vehicles still require that the driver walk from the refuse hopper to the auxiliary control station at the forward end of the vehicle in order to drive the vehicle between refuse pick-up stops.

The present invention provides a vehicle drivers' control station adjacent to the refuse hopper of a refuse collecting vehicle from which the driver operates the vehicle on a refuse collection route. The operator is thus able to function both as a driver and as a swamper since he operates the truck from adjacent the hopper. The control station includes a driver support member which is movable relative to the truck chassis so that the vehicle complies with local, state and federal vehicle width restrictions so that the vehicle may be driven on highways and freeways without a special operating permit. When the vehicle is operating on a highway or freeway away from the refuse collecting route, the driver support member is disposed within the maximum width of the truck. When the truck operates on the collection route, the movable driver support member is disposed laterally of the vehicle to provide maximum access to the refuse hopper.

The driver's control station may be provided as a low cost attachment apparatus compatible with existing vehicles. The present invention also encompasses a novel vehicle in which only one driver station is provided for the entire vehicle, this station preferably being movable. Where the driver station is provided as an attachment apparatus, it has controls connected to the existing controls of the vehicle.

Generally speaking, the present invention resides in a vehicle used for servicing operations which includes means at one end of the vehicle operable to achieve the service function of the vehicle. The present invention, in combination, comprises a vehicle controlling and guiding station mounted at the said end of the vehicle. The station includes a support member adapted for supporting an operator of the vehicle. The support member is movable between a first position located laterally of a side of the vehicle and a second position located within the confines of imaginary longitudinal extensions of the sides of the vehicle. The invention further comprises means for mounting the support member to the vehicle for movement between the first and second positions.

The above mentioned and other features of the invention are more completely set forth in the following detailed description of the invention taken in conjunction with the accompanying drawings, wherein:

FIG. 6 is a partial side elevational view of the rear end of the refuse collecting vehicle shown in FIG. 5;

FIG. 7 is a bottom plan view as taken along line VII—VII of FIG. 6;

FIG. 9 is a top plan view of a third embodiment of the present invention which provides attachment apparatus which may be nested against the side of the rear gate of the vehicle; and FIG. 10 is an elevation view of the apparatus shown in FIG. 9.

Figure 1:
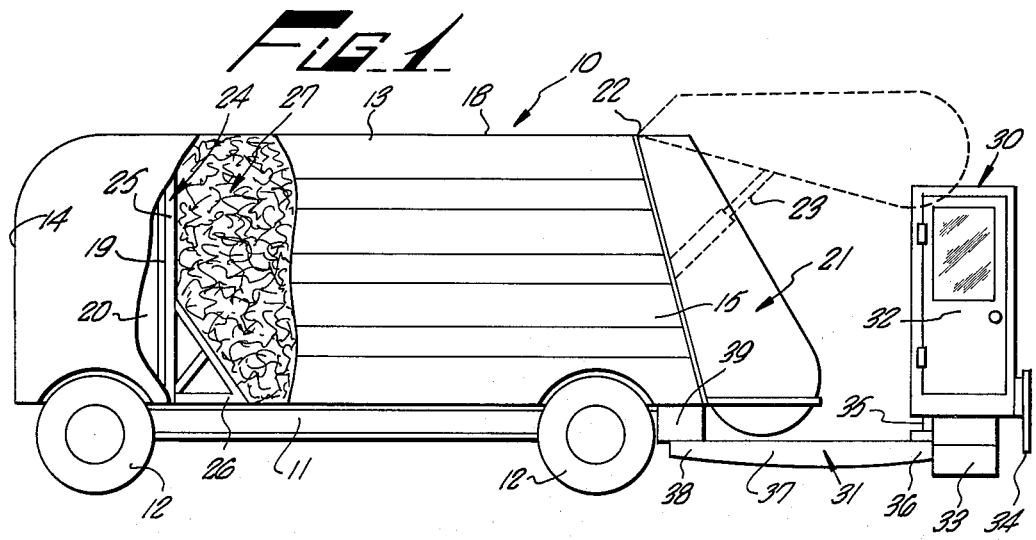
FIG. 1 is a side elevation view of a refuse collection vehicle according to the present invention.
Figure 2:
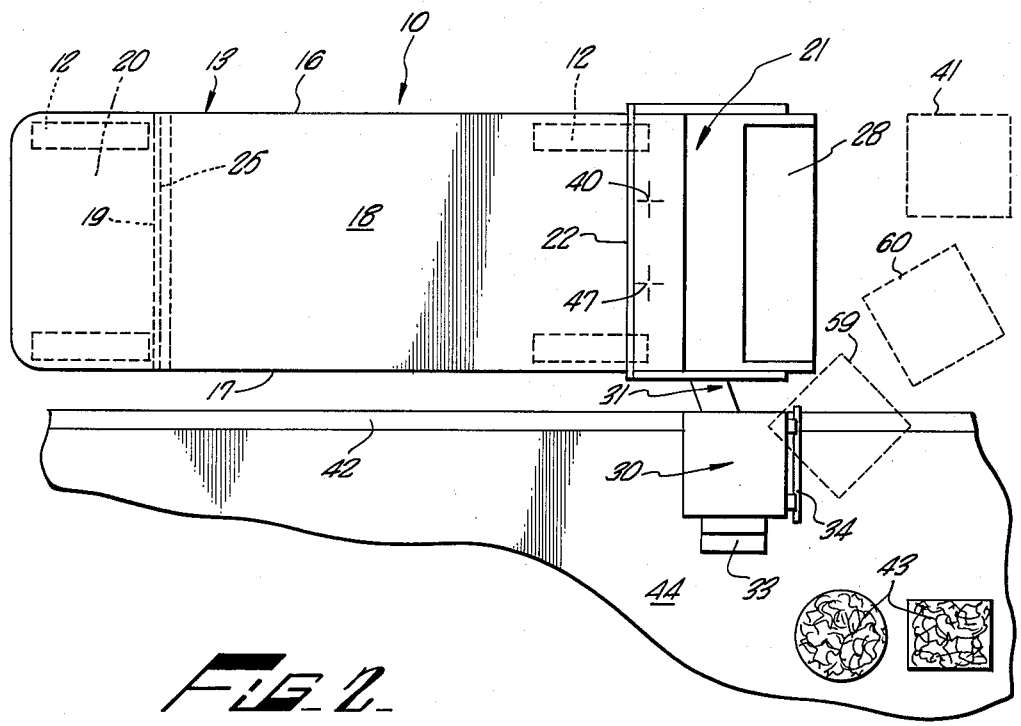
FIG. 2 is a top plan view of the vehicle illustrated in FIG. 1 showing the single driver's control station disposed laterally of the vehicle in solid lines, and in an aligned position and intermediate positions in dashed lines.

Referring initially to FIGS. 1 and 2, a refuse collection vehicle 10 according to the present invention is illustrated. An elongated chassis 11 is disposed longitudinally of the vehicle and a plurality of rotatable vehicle supporting wheels 12 are connected to the chassis and are arranged in pairs disposed transversely of the vehicle adjacent the ends of the chassis; tandem wheels may be mounted on the front or rear axles of the vehicle if desired. The wheels illustrated at the right or forward end of the vehicle in FIG. 1 are pivotable about vertical axes in order that the vehicle may be steered. A refuse storage bin or service-type body 13 is secured to the chassis and extends longitudinally of the vehicle. The bin has a rear end 14, a forward end 15, vertical side walls 16 and 17, and an upper surface or roof 18.

A vertically disposed transverse partition 19 extends across the interior of the storage bin at a location spaced forwardly of the rear end of the bin and defines a compartment 20 in the rear portion of the refuse bin. An internal combustion engine (not shown) is secured to chassis 11 within compartment 20 and is operably connected to at least one of the rear wheels of the vehicle to rotate the wheel for propulsion of the vehicle. It is preferred that the combination of the chassis and the engine provide a basic vehicle carriage similar to International Model 193–RE. It is also preferred that a "Select-O-Matic" Model T 85 transmission, manufactured by International Harvester Company, Chicago, Ill., or an equivalent transmission, be provided in conjunction with the engine. The chassis-transmission-engine combination differs from International Model 193–RE to the extent that the chassis does not mount any vehicle steering mechanisms directly thereto.

A refuse bin gate assembly 21 is connected to bin forward end 15 in closable relation with an opening extending from top to bottom and from side to side of the bin. The forward extent of the bin upper surface terminates rearwardly of the forward extent of the lower portion of the bin. The forward ends of the side walls of the bin slope upwardly and rearwardly toward the roof of the bin. Gate assembly 21 is connected to the vehicle body by a hinge means 22 located adjacent the bin roof. A hydraulic ram assembly 23 is connected between the vehicle body and the gate assembly for pivoting the gate assembly about its hinge means 22 in order that refuse collected within the bin may be expelled by operation of an ejector 24.

An alternate refuse ejection mechanism may be provided by making the refuse bin pivotable about the rear end of chassis 11 and by connecting an extensible ram between the bin and the chassis toward the rear of the vehicle. With such apparatus, the bin may be elevated similar to the operation of a dump truck. Gate assembly 21 is moved from closure relation with the bin before the bin is tipped to dump the collected refuse.

Ejector 24 is shown in FIG. 1 as comprising a vertical slide member or wall 25 which normally is engaged with partition 19. Wall 25 has a forwardly extending pusher extension 26 connected thereto which engages the floor of the refuse bin. A quantity of refuse is shown to be collected in the bin and is represented at 27. When the vehicle has been completely filled with refuse, the vehicle is driven to a dump or other discharge area and gate 21 is pivoted upwardly about hinge 22 by operation of ram 23. Ejector 24 is then operated so that wall 25 and extension 26 move forwardly of the chassis toward the open forward end of the bin. Movement of the ejector mechanism preferably is accomplished by a reciprocating hydraulic ram assembly (not illustrated); it is within the scope of this invention, however, that a chain drive or other mechanism means may be provided to effect reciprocal movement of ejector 24.

Gate assembly 21 includes a refuse conveyor mechanism and a refuse packer mechanism of conventional manufacture. Such devices are manufactured by Gar Wood Industries, Inc., Wayne, Mich.; by the Heil Co., Milwaukee, Wis.; and by Leach Co., Oshkosh, Wis. The gate assembly includes a refuse inlet hopper 28 which extends substantially completely transversely of the forward end of the vehicle so that swampers may introduce refuse into the loading and compacting mechanism of the gate assembly.

A driver's control station or cab 30 is movably mounted to vehicle chassis 11 by control station support means 31 and comprises a support member for the driver of the vehicle. As illustrated in FIGS. 1 and 2, the control station of vehicle 10 is a driver's cab having a door 32, steps 33 and a bumper 34. The cab is pivotally connected to the support means by a pedestal assembly 35 secured to a forward or outboard unsupported end 36 of the support means. The support means shown comprises a cantilever beam 37 which has a rear or inboard unsupported end 38 which is movably connected to the underside of chassis 11 by a pivot or hinge mechanism 39 having an axis 40. If desired, beam 31 may be pivotally mounted to the underside of gate assembly 21. The axes of rotation of the cab and the rear hinge mechanism are vertically aligned. The cab is accessible from as close to ground level as is possible.

Cab 30 is movable between a first position and a second position relative to vehicle chassis 11 by pivotal movement of cab support means 31 about axis 40. The first position of cab 30 is illustrated by solid lines in FIG. 2, the second position of the cab is represented by dashed lines 41. In its first position the cab is disposed laterally adjacent longitudinal side 17 of the vehicle refuse bin opposite refuse hopper 28. When the vehicle cab is in its first position, the driver of the vehicle may control the vehicle for movement of the vehicle along a street or road parallel to a curb 42 between refuse pick-up locations. As shown in FIG. 2, containers 43 of refuse are disposed on a lawn or yard 44 adjacent the curb preparatory to collection by the operator of the refuse collecting vehicle. Once the vehicle arrives at a particular collecting station, the operator of the vehicle can descend from cab 30, pick up the refuse containers 43 and discharge their contents into hopper 28 of gate assembly 21; the emptied containers are then returned to the lawn and the driver then reenters the cab to drive the vehicle to the next pick-up station which may be, say 60 feet away. Only one man is required in order to efficiently operate vehicle 10.

In order to provide for maximum refuse collection capacity, the width of the bin between the sides 16 and 17 approaches the maximum width consistent with operation on public highways. To assure full utilization of vehicle 10, it is necessary that the cab be movable from the position which it occupies during operation of the vehicle on a refuse collection route to a position between the sides of the vehicle. Accordingly, the present invention provides means for moving the cab from its first position to second position 41; these means include means for moving the cab support means 31 about pivot axis 40. It is noted at this point that it is desirable that the elongate extent of cantilever beam 37, which comprises the cab support means, be kept to a minimum in order to reduce the overall dimensions of the vehicle and to keep the cantilever load upon hinge mechanism 39 to a minimum. In order that the cab may pass the right front corner of the vehicle, means are provided by the present invention for indexing the cab about its axis of rotation during movement of the cab from its first to its second position.

Figure 3:
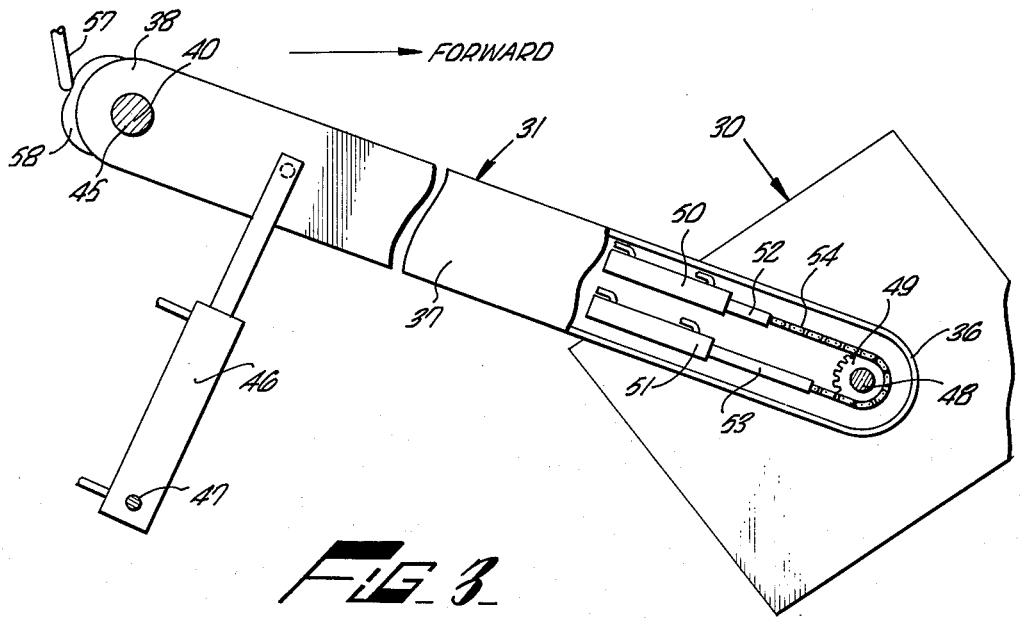
FIG. 3 is an enlarged plan view, looking upwardly with parts broken away, of a control station supporting and moving means for the vehicle illustrated in FIG. 1.

The mechanism for mounting and for moving cab 30 relative to vehicle chassis 11 is illustrated in FIG. 3 which shows a cab support means 37 as viewed from the underside of vehicle 10. Rear end 38 of beam 37 is journalled for rotational movement about a shaft 45 which depends from cab hinge assembly 39 concentric to axis 40. A selectively operable cab transit hydraulic ram assembly 46 is connected between the support beam and the chassis. The operation of the ram is controlled by the driver from cab 30. As illustrated in FIG. 3, the ram is connected to beam 37 at a point on beam removed from shaft 45; at its end opposite from the beam, the ram is connected to a depending pin or lug 47 which preferably is disposed along a line passing through axis 40 and disposed perpendicular to the elongate extent of chassis 11. Cab mounting pedestal 35 includes a depending shaft 48 which is rotatably journalled in unsupported end 36 of the cantilever beam. A peripherally toothed sprocket gear 49 is secured to shaft 48 within the beam for rotation with the shaft. A pair of hydraulically operated rams 50 and 51, having extensible pistons 52 and 53, respectively, are disposed within the elongate extent of the beam. A link chain 54, preferably of the timing type, has its opposite ends secured to the free ends of pistons 52 and 53 and is engaged with the teeth of sprocket gear 49. Rams 50 and 51 are cross connected (see FIG. 4) to provide a push-pull action upon chain 54 so that operation of the rams causes movement of the chain about shaft 48 to rotate the sprocket and shaft to change the angular alignment of cab 30 relative to vehicle chassis 11.

A cam controller valve 56 is provided for controlling the inlet/outlet functions of cross-connected rams 50 and 51. The valve has a movable, and preferably rotatable, porting control member which is controlled by a movable finger or cam follower 57 which engages a cam 58 secured to the rear end of cab support beam 37 in the vicinity of shaft 45. As ram 46 is actuated to move the beam about axis 40, the cam follower engages the control surface of the cam to operate the controller valve of the cross-connected rams to move the chain. Cam 58 is programmed so that as the cab approaches the right front corner of vehicle 10, the angular alignment of cab 30 relative to the chassis is varied (as illustrated by the dotted line positions 59 and 60 in FIG. 2) to enable the cab to pass the corner of the vehicle. Cam 58 also assures proper angular alignment of the cab in its second position (see dashed lines 41 of FIG. 2). The cab is substantially in alignment with the elongate extent of vehicle chassis 11 when it is in its second position.

The foregoing description of the support and movement mechanisms for beam 37 has been directed to a unitary rigid beam. It is within the scope of this invention, however, that a telescoping cab support means may be provided in order to reduce the distance between the cab and the vehicle gate assembly when the cab is in its second position. Alternatively, a plurality of parallel beams may be pivoted between the vehicle and the control station for support of the control station by a pantograph-type mechanism. Additional systems for mounting the driver's station will be apparent to those skilled in the art and therefore are not set forth at this point.

Figure 4:
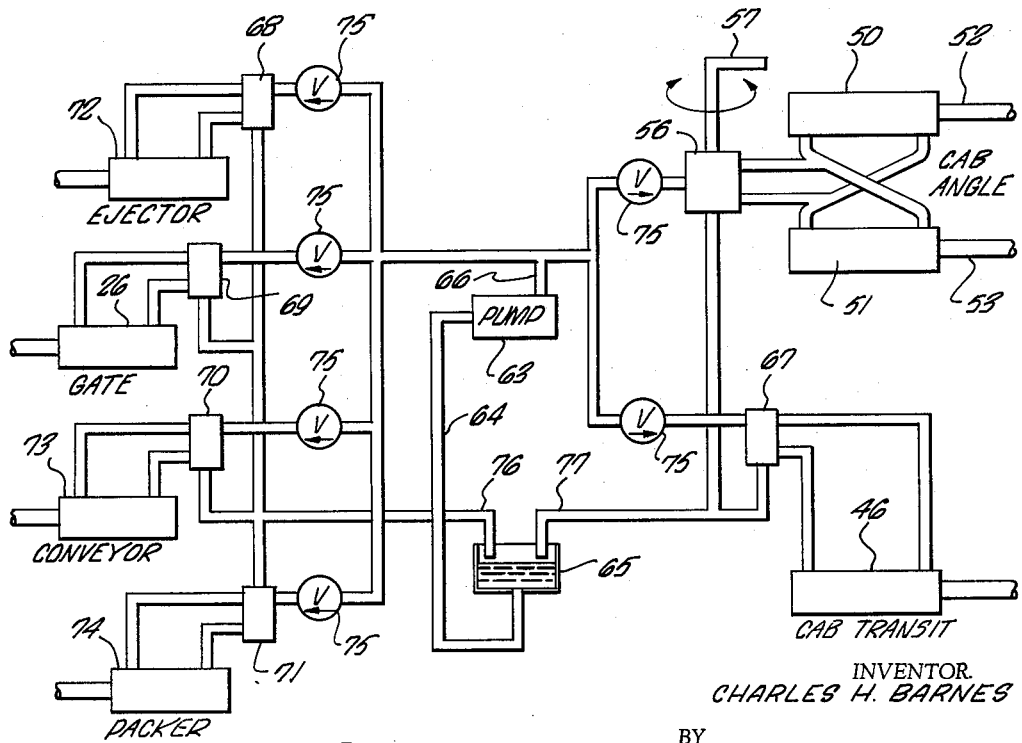
FIG. 4 is a schematic diagram of the principal hydraulic control elements of the vehicle illustrated in FIG. 1.

FIG. 4 presents a diagrammatic illustration of a portion of the hydraulic system of vehicle 10. A hydraulic pump 63 has an inlet duct 64 connected to a hydraulic fluid reservoir 65. A discharge duct 66 is connected to hydraulic controllers 56 and 67–71 associated with the cross-connected cab angle rams 50 and 51, the cab transit ram 46 and ejector ram 72, gate ram 26, a gate assembly conveyor ram 73, and a gate assembly packer mechanism 74, respectively. A check valve 75 is located upstream of each of the controllers to prevent loss of hydraulic fluid in the event of failure of any of the hydraulic mechanisms in the system. Hydraulic fluid return ducts 76 and 77 are connected between the controllers and the reservoir 65. The apparatus associated with the gate assembly conveyor and packer mechanisms are of conventional nature and to this extent the Gar Wood, Heil and Leach refuse collection vehicles are referred to.

Control cab 30 includes steering, accelerator, clutch and brake controls which are hydraulically, electrically or mechanically linked to the associated conventional mechanisms of vehicle 10. It will also be understood that controls for lights, starter, horn, shifting gears and the like are included in cab 30. Where mechanical interconnections between the cab and vehicle are provided, push-pull control cables of the type manufactured by the Automotive and Aircraft Division, American Chain and Cable Company, Inc., Detroit, Mich., are preferred. Hydraulic steering mechanisms are required for control of the forward wheels of the vehicle; to this extent power steering installations provided by Garrison Mfg. Co., Inc., Los Angeles, Calif., Catalog Dwg. Part No. 33862, is referred to. The gear shift connections between cab 30 and the engine transmission preferably is a hydraulic or pneumatic remote control of the type manufactured by the Transmission Division of Fuller Manufacturing Company, Kalamazoo, Mich. (Models 5–C–72, 5–C–720, 5–W–74, R–63, RA–63, R–660, R–96, RA–96, R–960, or RA–960).

In vehicle 10 it is preferred that the internal combustion engine provided for propulsion of the vehicle be disposed at the rear end of the vehicle in order to assure optimum weight distribution on the wheels of the vehicle in both the unloaded and loaded conditions, particularly in view of the cantilever load imposed on the chassis by cab 30.

The foregoing description of the present invention is directed to the provision of a novel vehicle which has a single driver's control station, the station being movable relative to the chassis of the vehicle from a position in substantial alignment with the elongate extent of the vehicle chassis to a position disposed laterally of the vehicle. A principal object of the present invention is to provide a vehicle in which the refuse hopper is disposed at the forward end of the vehicle as the vehicle moves along a refuse collecting route and to provide a vehicle which is maneuverable from that end of the vehicle. Existing refuse collection vehicles, however, are built around conventional truck chassis which have a stationary cab mounted at the forward end of the vehicle. A refuse storage bin is mounted to the vehicle chassis rearwardly of the fixed driver's cab and normally provides a refuse inlet hopper transversely of the rear of the vehicle. Such vehicles are operated on the refuse collecting route so that loading is accomplished at the rear of the vehicle. The configurations of existing vehicles prevent the vehicle being driven in reverse as trash is collected.

Figure 5:
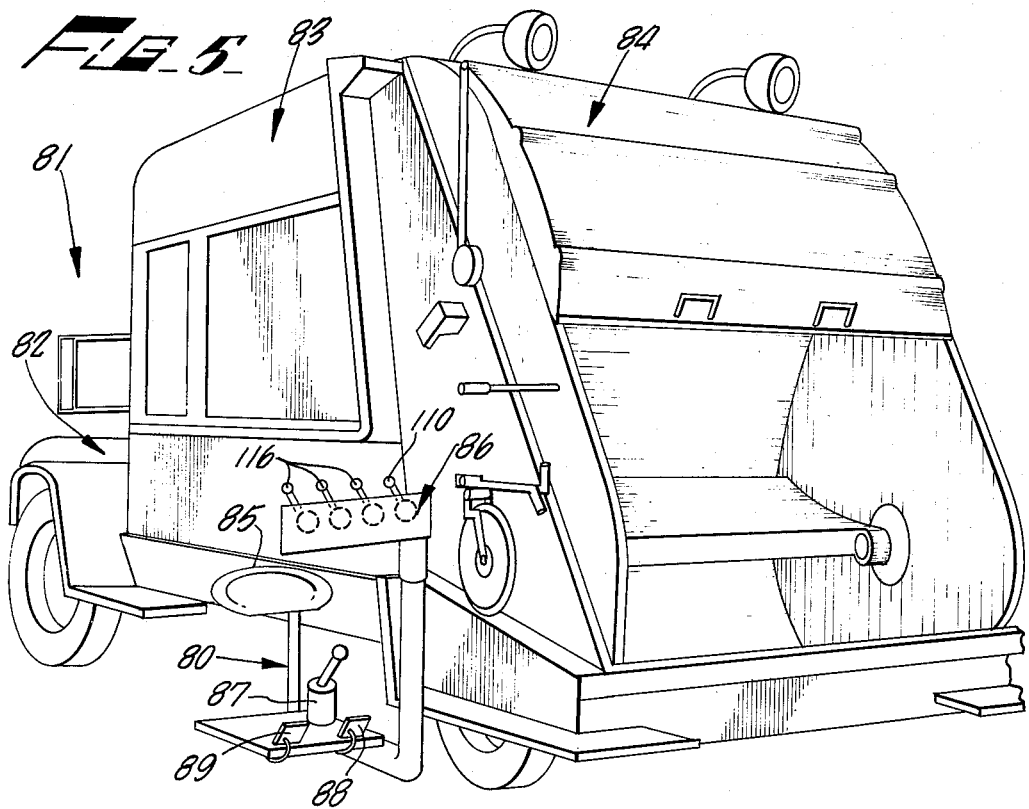
FIG. 5 is a perspective view of a second embodiment of the present invention which provides an attachment apparatus for an existing refuse collection vehicle.

FIGS. 5, 6, and 7 illustrate an embodiment of the present invention which provides an auxiliary driver's control station mounted to the rear of existing vehicles so that the vehicle may be driven backwardly or in reverse during a collection procedure. As with the environment illustrated in FIGS. 1–4, the embodiment illustrated in FIGS. 5–7 enables a single person to function both as vehicle driver and refuse loader.

An auxiliary driver's control station 80 is movably mounted at approximately curb level to the rear of an existing refuse collection vehicle 81 which has a fixed driver's control station cab 82 mounted to the forward portion of the vehicle. A refuse collecting bin 83 is mounted to the vehicle chassis and a gate assembly 84 is hingeably connected to the rear of the refuse bin. The structure of the refuse bin and gate assembly is conventional and does not form a portion of this invention. The structure of refuse collecting vehicles such as the Leach "Packmaster," the Heil "Collectomatic," and the Gar Wood "Loadpacker 600" refuse collection vehicles are referred to and incorporated herein as constituting exemplary environments for the auxiliary control station provided by the present invention.

Control station 80 includes a driver's seat for supporting a driver of the vehicle 85, a control console 86, a gear shift remote control unit 87, and clutch and brake pedals 88 and 89 mounted to a platform 90. Preferably the brake is automatically applied when the driver is not present at the control station, subject, however, to an override of the fail-safe brake from cab 82. Platform 90 is movably mounted by means of a rotatable pedestal assembly 91 to the free or unsupported end 92 of a movable cantilever-type beam 93 which is rotatably mounted at its supported end 94 to a depending support axle 95 attached to a foundation member 96 of the gate assembly. The axle has a vertically aligned axis 97 about which beam 93 is pivotally movable. As illustrated in FIG. 7, an extension member 98 is disposed along the elongate extent of support beam 93 and extends forwardly of pivot axle 95. Means for moving beam 93 are connected between extension 98 and gate assembly foundation member 96 and comprise an extensible hydraulic ram 99 which is connected between the extension and a lug 100 extending from forwardly of the underside of the gate assembly foundation member at a location spaced apart from pivot axle 95. In a preferred embodiment of the present invention, pivot axle 95 is disposed centrally of the vehicle in alignment with chassis 101. A pair of hydraulic fluid inlet/outlet conduits or ducts 102 and 103 are connected to ram assembly 99 and extend to connection with a hydraulic pump 104 (see FIG. 8). The conduits are aligned with existing hydraulic ducting of the gate assembly, which existing hydraulic ducting is connected to vehicle body 83 adjacent the hinged connection between the body and the gate assembly. Since the beam supporting axle and the hydraulic ram are mounted to gate assembly foundation member 96, the auxiliary control station is movable with the gate assembly when the gate assembly is hinged relative to the vehicle body for dumping refuse which is stored within the bin. It is within the scope of the present invention, however, that the beam support axle and the beam movement ram be connected to the vehicle chassis.

Figure 8:
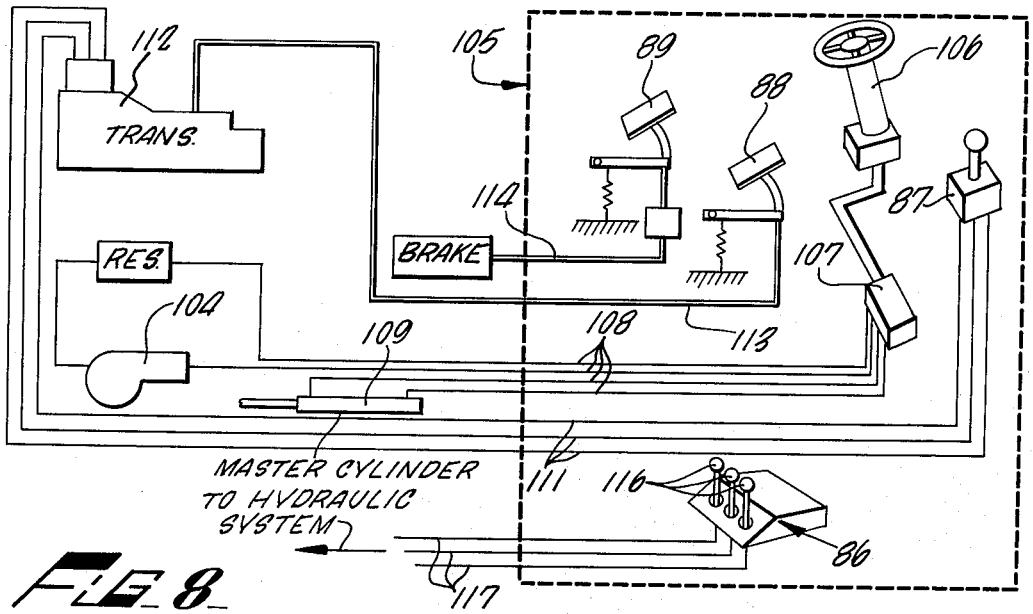
FIG. 8 is a diagrammatic illustration of the duplicate vehicle controls of an auxiliary vehicle control station.

In FIG. 8, dashed line 105 encompasses the elements of the vehicle control system which are disposed at auxiliary control station 80, including controls for lights, horn, starter and the like. As shown in FIG. 8, means for steering the vehicle from the auxiliary control station are provided by a conventional steering wheel mechanism 106 which is connected to power steering control housing 107 which in turn is connected to hydraulic pump 104 and to power steering master cylinder 109 which supplements the existing steering system of the vehicle. Alternatively, a tiller-type "joy-stick" mechanism 110 may be provided at control console 86 (see FIG. 5). Transmission remote control mechanism 87 may be hydraulically, pneumatically, mechanically or electrically operated; in either case, a plurality of suitable connectors 111 are connected between the remote control assembly and a transmission 112 of the vehicle. Clutch pedal 88 is mechanically interconnected by a push/pull cable 113 to transmission 112 or by a hydraulic or pneumatic connection; similarly brake peddle 89 is connected by a hydraulic or pneumatic conduit, or by a mechanical push/pull cable 114 to a brake mechanism provided as a part of vehicle 81. Control console 86 provides a plurality of controls 116 which are connected by suitable connections 117 to respective mechanisms of the existing vehicle. Elements 108, 111, 113, 114 and 117 are disposed along support beam 93. One of the auxiliary controls 116 is connected for operating beam positioning ram 99, another is connected for operating a two-speed rear axle 120 of the vehicle or an auxiliary transmission. A two-speed axle is substituted for the original single speed axle of the vehicle if the transmission does not have two reverse speeds. The provision of a two speed rear axle results in more efficient operation of the refuse collecting vehicle on a refuse collection route. An auxiliary transmission may be used in lieu of a two-speed rear axle.

A conventional vehicle equipped with the auxiliary control station may be driven at high speed over a highway or freeway from a garage or yard to the refuse collection route with the control station disposed in substantial alignment with chassis 101. Once the vehicle has arrived in the neighborhood of its refuse collecting route, the vehicle is turned around and the control station is moved from alignment with the chassis to the position illustrated to FIG. 5. The driver then descends from stationary cab 82 of the vehicle and operates the vehicle from the auxiliary control station. Refuse is loaded into the refuse hopper located at that end of vehicle which is the forward end as the vehicle moves along the collection route. It is then possible for the single crew member to function both as a swamper and as a vehicle driver during the collection of refuse.

FIGS. 9 and 10 illustrate a second preferred embodiment of the present invention provided as an attachment to an existing refuse collecting vehicle, such as vehicle 81 shown in FIG. 5. The attachment apparatus includes a control console 125 hinged to vehicle gate assembly 84 on the left rear of the vehicle. The control console is movable about a pivot connection 126 from a position in which the console is nested against the gate assembly (see FIG. 10) and a position in which the console extends laterally from the gate assembly, as shown in FIG. 9. In the latter position of the console, the console is disposed at least partially outwardly of the imaginary longitudinal extensions of the vehicle, such extensions being spaced apart a distance equal to the maximum width of the vehicle. In vehicle 81 the maximum width of the vehicle is defined by the width of refuse bin 83. A driver support member, such as seat 127, is disposed forwardly of the console and is movable from a position within the confines of the imaginary longitudinal side extensions to a position outwardly of the imaginary extensions, as shown in FIG. 10. Preferably, seat 127 is mounted to the gate assembly by a pivotable arm 128 which allows the desired movement of the seat relative to the gate assembly. As shown more clearly in FIG. 10 the seat and console in their extended positions are disposed so that the driver of the vehicle faces rearwardly in order that the vehicle may be backed down the street. As a result, the driver also may serve as a refuse loader. When the attachment apparatus is provided, as shown in FIGS. 9 and 10, a running board 129, which normally extends around the sides and rear of the gate assembly, is deleted from the right side of the gate assembly as indicated by the dashed lines of FIG. 9 in order to permit easy access to the extended seat and console.

It is preferred that the control mechanism of the auxiliary driver's station be connected in tandem with the control apparatus normally provided with the vehicle. It is also preferred that a fail-safe brake and accelerator override be provided.

In the foregoing discussion, the present invention has been described in conjunction with a refuse collection vehicle since it is felt that such vehicles best illustrate the utility of the invention. Such vehicles are but an example of the service-type, special purpose vehicles which are contemplated by the scope of the invention. Another service-type vehicle with which the movable control station may be used is a concrete truck of the type used for transporting pre-mix concrete from a central supply source to remote locations where the concrete is poured. The term "service-type vehicle" is used to mean any vehicle designed for special rather than general purposes, and which is accessible at one end by operators thereof to achieve the special purpose.

While the invention has been described above in conjunction with specific apparatus and configurations of apparatus, this has been by way of example only and is not to be considered as limiting the scope of the present invention.

What is claimed is:

1. In a refuse collection vehicle having a forward end and a rear end, a wheeled chassis, means for propelling the vehicle, a vehicle control cab fixedly mounted to the chassis at the front end thereof, a refuse storage bin fixedly mounted to the chassis rearwardly of the cab and having a refuse hopper opening from the bin across the rear end of the vehicle, the improvement residing in movable auxiliary vehicle control means for driving the vehicle from the rear end in a direction so that the vehicle is loaded at that end which is the forward end as the vehicle moves along a refuse collection route, the auxiliary control means comprising an auxiliary vehicle control station for an operator of the vehicle, support means for supporting the auxiliarly control station independently of the vehicle wheels, means for movably mounting the support means to the rear of the vehicle, the auxiliary control station being movable between a first position laterally of the rear end of the vehicle and a second position aligned with the vehicle, and means at the auxiliary control station operable by the operator and connected to the means for propelling the vehicle for initiating movement of the vehicle.

2. A service-type vehicle comprising a wheeled chassis, a body secured to the chassis, a movable vehicle control station disposed adjacent one end of the vehicle, a shaft depending from the vehicle adjacent the one end thereof, a rigid beam, means mounting the control station to one end of the beam, means for movably mounting the other end of the beam to the shaft so that the beam and the control station are cantilevered from the vehicle and the control station is supported independently of the vehicle wheels, an extensible ram assembly connected to the beam and to the vehicle and operable to move the beam angularly about the shaft to move the control station between a first and second position relative to the chassis, the control station being disposed laterally of the vehicle one end in its first position and being disposed in substantial alignment with the elongate extent of the chassis in its second position, means at the control station operable by a driver of the vehicle for initiating movement of the vehicle in a direction wherein the one end thereof is the vehicle forward end, and means at the control station for steering the vehicle in such movement.

3. A service-type vehicle comprising a wheeled chassis, a body secured to the chassis, a movable vehicle control station disposed adjacent one end of the vehicle, a first shaft depending from the vehicle adjacent the one end thereof, a second shaft depending from the control station, a rigid beam, means at one end of the beam for rotatably mounting the second shaft to the beam, means for movably mounting the other end of the beam to the shaft so that the beam and the control station are cantilevered from the vehicle and the control station is supported independently of the vehicle wheels, selectively operable means connected to the beam operable to move the control station between a first and second positions relative to the chassis, the control station being disposed laterally of the vehicle one end in its first position and being disposed in substantial alignment with the elongate extent of the chassis in its second position, means for rotating the second shaft to vary the angular relation of the control station relative to the beam, means at the control station operable by a driver of the vehicle for initiating movement of the vehicle in a direction wherein the one end thereof is the vehicle forward end, and means at the control station for steering the vehicle in such movement.

4. A service-type vehicle comprising a wheeled chassis, a body secured to the chassis, a movable vehicle control station disposed adjacent one end of the vehicle, a first shaft depending from the vehicle adjacent the one end thereof, a second shaft depending from the control station, a rigid beam, means at one end of the beam for rotatably mounting the second shaft to the beam, means for movably mounting the other end of the beam to the shaft so that the beam and the control station are cantilevered from the vehicle and the control station is supported independently of the vehicle wheels, selectively operable means connected to the beam operable to move the control station between a first and second positions relative to the chassis, the control station being disposed laterally of the vehicle one end in its first position and being disposed in substantial alignment with the elongate extent of the chassis in its second position, a sprocket gear secured to the second shaft for rotation therewith, a length of chain engaged with a portion of the periphery of the sprocket gear, selectively operable means for moving the chain for varying the angular relation of the control station relative to the beam, means at the control station operable by a driver of the vehicle for initiating movement of the vehicle in a direction wherein the one end thereof is the vehicle forward end, and means at the control station for steering the vehicle in such movement.

5. A service-type vehicle comprising a wheeled chassis, a body secured to the chassis, a movable vehicle control station disposed adjacent one end of the vehicle, a first shaft depending from the vehicle adjacent the one end thereof, a second shaft depending from the control station, a rigid beam, means at one end of the beam for rotatably mounting the second shaft to the beam, means for movably mounting the other end of the beam to the shaft so that the beam and the control station are cantilevered from the vehicle and the control station is supported independently of the vehicle wheels, first selectively operable means connected to the beam operable to move the control station between a first and second positions relative to the chassis, the control station being disposed laterally of the vehicle one end in its first position and being disposed in substantial alignment with the elongate extent of the chassis in its second position, a sprocket gear secured to the second shaft for rotation therewith, a length of chain engaged with a portion of the periphery of the sprocket gear, second selectively operable means for moving the chain for varying the angular relation of the control station relative to the beam, the second selectively operable means being connected to the first selectively operable means for operation thereof in response to movement of the beam about the first shaft, means at the control station operable by a driver of the vehicle for initiating movement of the vehicle in a direction wherein the one end thereof is the vehicle forward end, and means at the control station for steering the vehicle in such movement.

6. A service-type vehicle comprising a wheeled chassis, a body secured to the chassis, a movable vehicle control station disposed adjacent one end of the vehicle, a first shaft depending from the vehicle adjacent the one end thereof, a second shaft depending from the control station, a rigid beam, means at one end of the beam for rotatably mounting the second shaft to the beam, means for movably mounting the other end of the beam to the shaft so that the beam and the control station are cantilevered from the vehicle and the control station is supported independently of the vehicle wheels, selectively operable means connected to the beam operable to move the control station between a first and second positions relative to the chassis, the control station being disposed laterally of the vehicle one end in its first position and being disposed in substantial alignment with the elongate extent of the chassis in its second position, means responsive to movement of the beam about the first shaft for rotating the second shaft to vary the angular relation of the control station relative to the beam, means at the control station operable by a driver of the vehicle for initiating movement of the vehicle in a direction wherein the one end thereof is the vehicle forward end, and means at the control station for steering the vehicle in such movement.

7. A service-type vehicle comprising a wheeled chassis, a body secured to the chassis, a movable vehicle control station disposed adjacent one end of the vehicle, control station support means for supporting the control station and for movably mounting the control station to said one end of the vehicle independently of the vehicle wheels, selectively operable means connected to the support means operable to move the control station between first and second positions relative to the chassis, the control station being disposed laterally of the vehicle one end in its first position and being disposed in substantial alignment with the elongate extent of the chassis in its second position, means for connecting the control station to the support means for rotatable movement of the control station relative to the support means, means operable in response to movement of the support means relative to the vehicle for rotating the control station relative to the support means, means at the control station operable by a driver of the vehicle for initiating movement of the vehicle in a direction wherein the one end of the vehicle is the vehicle forward end, and means at the station for steering the vehicle in such movement.

8. A refuse collection vehicle having spaced apart ends comprising a unitary elongated chassis, a plurality of wheels supporting the chassis, a refuse storage bin secured to the chassis and having refuse hopper means therein at one end of the vehicle, a movable vehicle control station disposed adjacent the one end of the vehicle, a cantilever beam having an unsupported end and a supported end, means for mounting the control station to the beam unsupported end, means for mounting the supported end of the beam to the vehicle for angular movement of the beam relative to the vehicle, selectively operable means connected to the beam and to the vehicle operable to move the beam angularly relative to the vehicle to move the control station between first and second positions relative to the vehicle, the control station being disposed laterally of the vehicle one end in its first position and being disposed in substantial alignment with the elongate extent of the chassis in its second position, means at the control station operable by a driver of the vehicle for initiating movement of the vehicle in a direction wherein the one end of the vehicle is the vehicle forward end and for controlling the direction and speed of such movement, and a second vehicle control station at the other end of the vehicle fixed to the chassis.

9. A refuse collection vehicle having spaced apart ends comprising a unitary elongated chassis, a plurality of wheels supporting the chassis, a refuse storage bin secured to the chassis and having refuse hopper means therein at one end of the vehicle, a movable vehicle control station disposed adjacent the one end of the vehicle, a cantilever beam having an unsupported end and a supported end, a shaft depending from the control station, means for rotably mounting the shaft to the beam unsupported end for rotation about a vertical axis, means for mounting the supported end of the beam to the vehicle for angular movement of the beam relative to the vehicle, selectively operable means connected to the beam and to the vehicle operable to move the beam angularly relative to the vehicle to move the control station between a first and second positions relative to the vehicle, the control station being disposed laterally of the vehicle one end in its first position and being disposed in substantial alignment with the elongate extent of the chassis in its second position, means for rotating the shaft including a sprocket gear secured to the shaft for rotation therewith and having radially extending teeth, a pair of cross-connected extensible rams disposed adjacent the gear, a length of chain connected between the rams and engaged with the gear teeth, and means operable in response to the angular relation of the beam to the vehicle for operating the rams to move the chain and rotate the gear, and means at the control station operable by a driver of the vehicle for initiating movement of the vehicle in a direction wherein the one end of the vehicle is the vehicle forward end and for controlling the direction and speed of such movement.

10. In a refuse collection vehicle having spaced apart ends, an elongated chassis, a plurality of wheels for supporting the chassis, a refuse bin secured to the chassis defining the maximum width of the vehicle and having an opening thereacross at the one end of the vehicle, a gate assembly closing the opening and including refuse hopper means at the one end of the vehicle, the refuse hopper means having a width less than the width of the bin, a vehicle control station disposed adjacent the one end of the vehicle and including a support member for supporting an operator of the vehicle, means for mounting the support member for movement between a first position in which the support member is disposed against the refuse hopper means within the maximum width of the vehicle and a second position in which the support member is disposed at least partially laterally outwardly beyond the maximum width of the vehicle adjacent the refuse hopper means, and vehicle control means including a control console mounted to the gate assembly and disposed in a position accessible to the driver when the driver is supported on the support member in the second position thereof for initiating movement of the vehicle in a direction wherein the one end of the vehicle is the vehicle forward end and for controlling the speed and direction of such movement.

11. In a refuse collection vehicle having spaced apart ends, an elongated chassis, a plurality of wheels for supporting the chassis, a refuse bin secured to the chassis defining the maximum width of the vehicle and having an opening thereacross at the one end of the vehicle, a gate assembly closing the opening and including refuse hopper means at the one end of the vehicle, the refuse hopper means having a width less than the width of the bin, a vehicle control station disposed adjacent the one end of the vehicle and including a support member for supporting an operator of the vehicle, means for mounting the support member for movement between a first position in which the support member is disposed against the refuse hopper means within the maximum width of the vehicle and a second position in which the support member is disposed at least partially laterally outwardly beyond the maximum width of the vehicle adjacent the refuse hopper means, and vehicle control means including a control console mounted to the gate assembly and disposed in a position accessible to the driver when the driver is supported on the support member in the second position thereof for initiating movement of the vehicle in a direction wherein the one end of the vehicle is the vehicle forward end and for controlling the speed and direction of such movement, the control console being movable from a position nested against the refuse hopper means to a position adjacent the support member when the support member is disposed spaced from the hopper means.

12. In a refuse collection vehicle having an elongated chassis, a control cab for an operator of the vehicle substantially fixedly mounted to the front end of the chassis, a refuse bin secured to the chassis and extending rearwardly of the cab to the rear end of the chassis, the refuse bin defining substantially the maximum width of the vehicle and having an opening across substantially the entire rear end thereof, a gate assembly mounted to the rear end of the refuse bin, the gate assembly being hingeably mounted to the bin at the top of the bin so that the gate assembly is movable between a position in which the gate assembly closes the rear end of the bin and a position in which the rear end of the bin is open so that refuse contained in the bin may be discharged therefrom through the open rear end of the bin, and means connected between the bin and the gate assembly for moving the gate assembly between the two positions thereof relative to the bin, the gate assembly including a refuse hopper having a width less than but approximating the width of the bin, the improvement in an auxiliary control station for the operator of the vehicle mounted to the gate assembly comprising a seat for the operator, means mounting the seat to the gate assembly so that the seat is movable between a position nested against the refuse hopper within the maximum width of the vehicle and a position spaced laterally from the hopper, a control console mounted to the gate assembly so that the console is movable between a position nested against the refuse hopper and a position wherein the console is accessible to the operator when the seat is spaced laterally from the hopper and the operator faces rearwardly of the vehicle, and means accessible to and operable by the rearwardly facing operator for initiating and controlling movement of the vehicle.

References Cited by the Examiner

UNITED STATES PATENTS

| | | |
|---|---|---|
| 1,685,171 | 9/1928 | McVicker et al. |
| 2,384,890 | 9/1945 | Coldwell. |
| 2,422,813 | 6/1947 | Walch _____ 37—126 |
| 2,557,142 | 6/1951 | Reitz _____ 214—503 |
| 2,607,432 | 8/1952 | Lommel. |
| 2,624,478 | 1/1953 | Kaplan. |
| 2,833,367 | 5/1958 | Pool et al. |
| 3,032,216 | 5/1962 | McCarthy _____ 214—302 |

FOREIGN PATENTS

| | | |
|---|---|---|
| 216,910 | 8/1961 | Austria. |
| 1,022,156 | 1/1958 | Germany. |

GERALD M. FORLENZA, *Primary Examiner.*